(12) United States Patent
Hong et al.

(10) Patent No.: US 9,207,528 B2
(45) Date of Patent: Dec. 8, 2015

(54) THIN SHEET GLASS PROCESSING

(75) Inventors: Seung Jae Hong, Sunnyvale, CA (US); Lili Huang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1440 days.

(21) Appl. No.: 12/895,825

(22) Filed: Sep. 30, 2010

(65) Prior Publication Data

US 2011/0298730 A1    Dec. 8, 2011

Related U.S. Application Data

(60) Provisional application No. 61/351,818, filed on Jun. 4, 2010.

(51) Int. Cl.
*G03B 27/32* (2006.01)
*G06F 3/044* (2006.01)

(52) U.S. Cl.
CPC ............... *G03B 27/32* (2013.01); *G06F 3/044* (2013.01); *Y10T 29/49105* (2015.01)

(58) Field of Classification Search
None
See application file for complete search history.

(56) References Cited

U.S. PATENT DOCUMENTS

| | | | |
|---|---|---|---|
| 3,558,415 A | 1/1971 | Rieser et al. |
| 3,607,172 A | 9/1971 | Poole et al. |
| 3,798,013 A | 3/1974 | Hasegawa et al. |
| 3,843,472 A | 10/1974 | Toussaint et al. |
| 4,015,045 A | 3/1977 | Rinehart |
| 4,119,760 A | 10/1978 | Rinehart |
| 4,165,228 A | 8/1979 | Ebata et al. |
| 4,178,082 A | 12/1979 | Ganswein et al. |
| 4,646,722 A | 3/1987 | Silverstein et al. |
| 4,849,002 A | 7/1989 | Rapp |
| 4,872,896 A | 10/1989 | LaCourse et al. |
| 5,369,267 A | 11/1994 | Johnson et al. |
| 5,733,622 A | 3/1998 | Starcke et al. |
| 5,930,047 A | 7/1999 | Gunz et al. |
| 5,953,094 A | 9/1999 | Matsuoka et al. |
| 6,516,634 B1 | 2/2003 | Green et al. |
| 6,521,862 B1 | 2/2003 | Brannon |
| 6,621,542 B1 | 9/2003 | Aruga |

(Continued)

FOREIGN PATENT DOCUMENTS

| | | |
|---|---|---|
| AT | 283 630 B | 10/1970 |
| DE | 17 71 268 A1 | 12/1971 |

(Continued)

OTHER PUBLICATIONS

Chemically Strengthened Glass, Wikipedia, Apr. 19, 2009, http://en/wikipedia.org/w/index.php?title=Chemically_strengthened_glass&oldid=284794988.

(Continued)

*Primary Examiner* — Kent Chang
*Assistant Examiner* — Benjamin Morales Fernande

(57) ABSTRACT

Improved techniques are disclosed for fabrication of touch panels using thin sheet glass. Thin touch sensor panels each having a thickness of substantially less than approximately one-half millimeter can be produced. A thin mother glass sheet having a thickness of substantially less then approximately one half millimeter can be used. A thin film can be coupled to a surface of the thin mother glass sheet, and the thin film can be photolithographically patterned, while avoiding breakage of the thin mother glass sheet. The thin mother glass sheet can be singulated into the thin touch sensor panels.

25 Claims, 16 Drawing Sheets

(56) References Cited

U.S. PATENT DOCUMENTS

| | | |
|---|---|---|
| 6,810,688 B1 | 11/2004 | Duisit et al. |
| 7,810,355 B2 | 10/2010 | Feinstein et al. |
| 2002/0035853 A1 | 3/2002 | Brown et al. |
| 2006/0238695 A1 | 10/2006 | Miyamoto |
| 2007/0013822 A1 | 1/2007 | Kawata et al. |
| 2007/0030436 A1 | 2/2007 | Sasabayashi |
| 2007/0236618 A1 | 10/2007 | Magg et al. |
| 2008/0202167 A1 | 8/2008 | Cavallaro et al. |
| 2008/0243321 A1 | 10/2008 | Walser et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0090694 A1* | 4/2009 | Hotelling et al. ............... 216/41 |
| 2009/0139864 A1* | 6/2009 | Nakamura et al. ....... 204/298.25 |
| 2009/0153729 A1 | 6/2009 | Hiltunen et al. |
| 2009/0197048 A1 | 8/2009 | Amin et al. |
| 2009/0202808 A1 | 8/2009 | Glaesemann et al. |
| 2009/0257189 A1 | 10/2009 | Wang et al. |
| 2009/0324899 A1* | 12/2009 | Feinstein et al. ............ 428/195.1 |
| 2009/0324939 A1* | 12/2009 | Feinstein et al. .............. 428/337 |
| 2010/0009154 A1 | 1/2010 | Allan et al. |
| 2010/0296027 A1 | 11/2010 | Matsuhira et al. |
| 2010/0315570 A1 | 12/2010 | Mathew et al. |
| 2011/0003619 A1 | 1/2011 | Fujii |
| 2011/0019123 A1 | 1/2011 | Prest et al. |
| 2011/0019354 A1 | 1/2011 | Prest et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0128237 A1* | 6/2011 | Rothkopf et al. ............. 345/173 |
| 2011/0159321 A1 | 6/2011 | Eda et al. |
| 2011/0164372 A1 | 7/2011 | McClure et al. |
| 2011/0300908 A1 | 12/2011 | Grespan et al. |
| 2012/0135195 A1 | 5/2012 | Glaesemann et al. |
| 2012/0281381 A1 | 11/2012 | Sanford |

FOREIGN PATENT DOCUMENTS

| | | |
|---|---|---|
| DE | 32 12 612 A1 | 10/1983 |
| EP | 2025556 A2 | 2/2009 |
| EP | 2036867 A1 | 3/2009 |
| EP | 2075237 | 7/2009 |
| GB | 1 346 747 | 2/1974 |
| JP | 55 144450 | 11/1980 |
| JP | 63 060129 | 3/1988 |
| JP | 6242260 A | 9/1994 |
| JP | 2010 064943 | 3/2010 |
| JP | 2010/195600 | 9/2010 |
| WO | WO 00/47529 A | 8/2000 |
| WO | WO 02/42838 A1 | 5/2002 |
| WO | WO 2004/106253 A | 12/2004 |
| WO | WO 2008/143999 A1 | 11/2008 |
| WO | WO 2010/005578 | 1/2010 |
| WO | WO 2010/014163 | 2/2010 |
| WO | WO 2012/106280 | 8/2012 |

OTHER PUBLICATIONS

Wikipedia: "Iphone 4", www.wikipedia.org, retrived Oct. 31, 2011, 15 pgs.

"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.

Arun K. Varshneya, Chemical Strengthening of Glass: Lessions Learned and Yet to be Loearned, International Journal of Applied Glass Science, 2010, 1, 2, pp. 131-142.

* cited by examiner

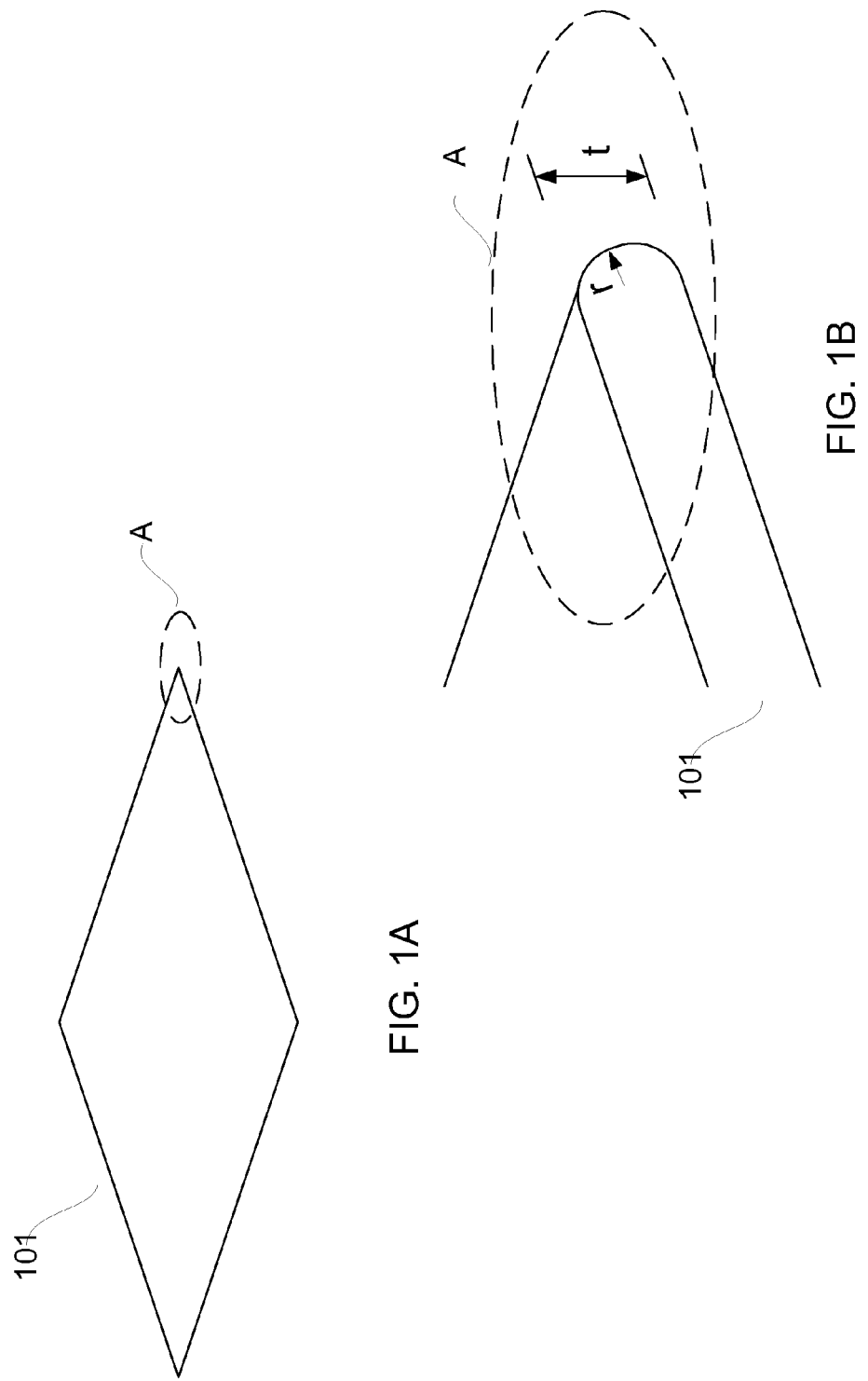

THIN SHEET GLASS PROCESSING

CROSS-REFERENCE TO RELATED APPLICATION

This application claims priority to U.S. Provisional Patent Application No. 61/351,818, filed Jun. 4, 2010, and entitled "Thin Sheet Glass Processing", which is hereby incorporated herein by reference.

BACKGROUND OF THE INVENTION

1. Field of the Invention

This relates generally to the fabrication using thin sheets of substrate material, and more particularly, to the fabrication using thin sheet glass.

2. Description of the Related Art

Early computer systems used command-line interfaces, wherein users typed commands to perform specific tasks. While this was well adapted to the use of teletype machines or video display terminals wired to mainframe computers, more user friendly interfaces were desired. Use of a graphical user interface employing a computer mouse as a pointing device overcame many short comings of the command-line interface. However, considerations such as size and inconvenience of the computer mouse become more burdensome as electronic devices become smaller and more portable. Accordingly, the computer mouse may have become less preferred as a way of interacting with some portable electronic devices.

Touch panels have become a preferred way for users to interact with portable electronic devices, such as mobile telephones, digital media players and the like. The iPhone™ and iPod Touch™ manufactured by Apple Inc. of Cupertino, Calif. are popular examples of such portable electronic devices. Such portable electronic devices can include a substantially optically transparent glass touch panel arranged over a display, so that the display is visible through the touch panel.

In general, the thicker the glass, the stronger it is. However, there is strong consumer demand for making portable electronic devices thinner. Accordingly, glass touch panels can be more susceptible to damage, especially during fabrication and processing, if one attempts to make them thinner. Thus, there is a need for improved techniques for fabrication using thin sheet glass.

SUMMARY OF THE INVENTION

Improved techniques are disclosed for fabrication of touch panels using thin sheet glass. The invention can be implemented in numerous ways, including as a method, system, device and apparatus. Several embodiments of the invention are discussed below.

As an apparatus, one embodiment can include at least a touch sensor panel comprising a glass substrate having a thickness of substantially less than approximately one half millimeter, and a first patterned thin film coupled to a first major surface of the glass substrate.

As an apparatus, another embodiment can include at least a touch sensor panel comprising a glass substrate having a thickness of substantially less than approximately one half millimeter, and a first patterned thin film coupled to a first major surface of the glass substrate; and a portable electronic device incorporating the touch sensor panel.

As a method for producing thin touch sensor panels each having a thickness of substantially less than approximately one-half millimeter, one embodiment can include at least the acts of obtaining a thin mother glass sheet having a thickness of substantially less then approximately one half millimeter, depositing a thin film coupled to a surface of the thin mother glass sheet, and photo lithographically patterning the thin film while avoiding breakage of the thin mother glass sheet. Thereafter, the thin mother glass sheet can be singulated into the thin touch sensor panels.

As an apparatus for photolithographic patterning of thin touch sensor panels each having a thickness of substantially less than approximately one-half millimeter, one embodiment can include at least a thin mother glass sheet of the thin touch sensor panels and a plurality of support members. The thin mother glass sheet can have a thickness of substantially less then approximately one half millimeter. The plurality of support members are sufficiently numerous so as to avoid breakage of the thin mother glass sheet during photolithographic patterning of the thin touch sensor panels of the thin mother glass sheet.

As an apparatus for photolithographic patterning of thin touch sensor panels each having a thickness of substantially less than approximately one-half millimeter, another embodiment can include at least a thin mother glass sheet of the thin touch sensor panels, wherein the thin mother glass sheet has a thickness of substantially less then approximately one half millimeter; and support members disposed sufficiently proximate to one another so as to avoid breakage of the thin mother glass sheet.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 1A-1I show various views of processing thin touch sensor panels.

DETAILED DESCRIPTION OF EMBODIMENTS OF THE INVENTION

Improved techniques are disclosed for fabrication of touch panels using thin sheet glass. Thin touch sensor panels each having a thickness of substantially less than approximately one-half millimeter can be produced. A thin mother glass sheet having a thickness of substantially less then approximately one half millimeter can be used. A thin film can be coupled to a surface of the thin mother glass sheet, and the thin film can be photolithographically patterned, while avoiding breakage of the thin mother glass sheet. The thin mother glass sheet can be singulated into the thin touch sensor panels.

Embodiments of the invention are discussed below with reference to FIGS. 1-6. However, those skilled in the art will readily appreciate that the detailed description given herein with respect to these figures is for explanatory purposes, as the invention extends beyond these limited embodiments.

Figure 1C:
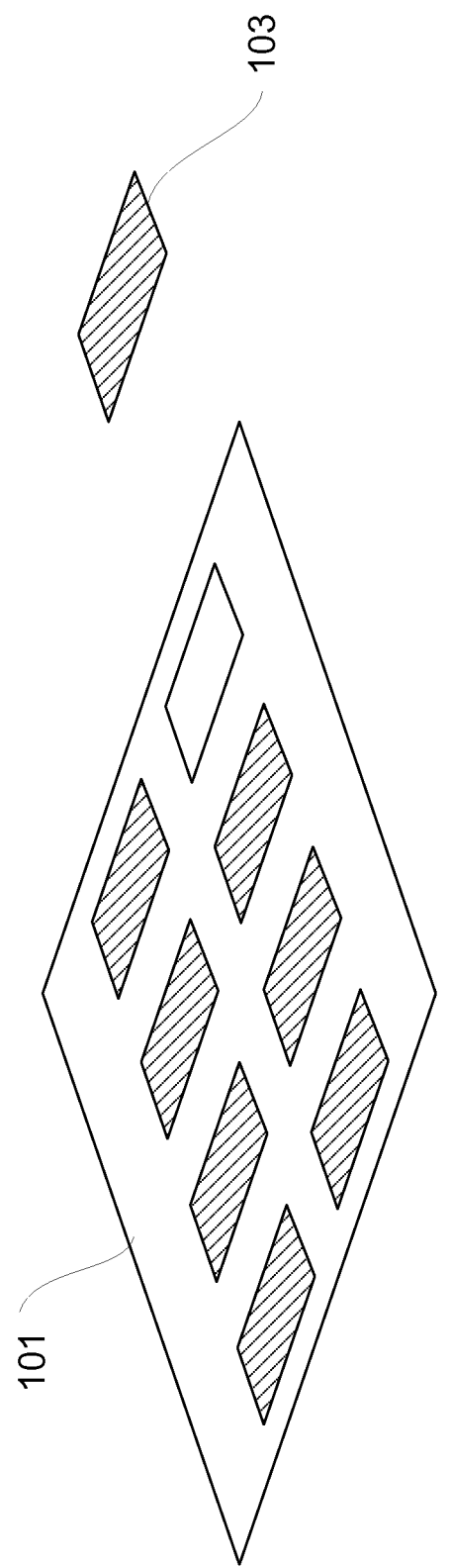

FIGS. 1A-1I show various views of processing the thin mother glass sheet into the thin touch sensor panels. FIG. 1A shows perspective view, and FIG. 1B shows a detailed view of a thin mother glass sheet 101, which can have a thickness "t" of substantially less than approximately one-half millimeter. The thickness "t" of the thin mother glass sheet 101 may be less than about 0.4 millimeter, may be approximately 0.33 millimeter, or may be approximately 0.3 millimeter.

Edges of the thin mother glass sheet 101 can be manipulated to correspond to a predefined edge geometry, wherein the predefined edge geometry can be selected to strengthen the thin mother glass sheet 101. In particular, edges of the thin mother sheet glass can be ground, for example by mechanical grinding, so as to round the edges to a substantial roundness as shown in FIG. 1B. The roundness may vary, and a rounded protruding edge dimension "r" shown in FIG. 1B may be substantially within a range from approximately 0.05 millimeters to a approximately 0.8 millimeters.

Besides the rounding of the edges illustrated in FIG. 1B, the edges of the thin mother sheet glass can be machined in ways other than through rounding. As one example, edge geometries can pertain to flattening of the edges. As additional examples, edge geometries can be complex geometries.

For example, the thin mother sheet glass may have edge geometry that includes a chamfered edge. Further, the edge geometry may flattened edges (in such case the edge geometry is effectively a chamfered edge). A chamfer may comprise a beveled edge that substantially connects two sides or surfaces, associated with the chamfered edge. With the chamfered edge, substantially minimum compressive stresses may occur approximately at convex locations of the beveled edge. One location which corresponds to a substantially minimum Van Mises stress location is near a corner and proximate to a major surface associated with such edge geometry.

As another example, the thin mother sheet glass may have an edge geometry that includes a straight corner. In such case, the edge geometry is a straight corner, e.g., an approximately 90 degree corner. With such edge geometry, an area of substantially minimum compressive stress occurs at a convex location of the straight corner. One location which corresponds to a substantially minimum Van Mises stress location is near the straight corner and proximate to a major surface associated with such edge geometry.

Size of the thin mother glass sheet 101 can be large, for example dimensions may be approximately two feet by three feet. Substantially optically transparent glass can be used. In particular, soda lime glass or aluminosilicate glass may be used for the thin mother glass sheet 101. The thin mother glass sheet 101 may be chemically strengthened by submersion in a molten potassium bath for a sufficient period of time (for example approximately 100% KNO3 at approximately four-hundred and fifty degrees centigrade for approximately ninety minutes.)

A thin film can be coupled to a surface of the thin mother glass sheet, and the thin film can be photolithographically patterned, while avoiding breakage of the thin mother glass sheet. The patterned thin film can comprise a substantially optically transparent and substantially conductive patterned thin film of indium tin oxide (ITO). A respective patterned thin film of each of the thin touch sensor panels can be arranged as substantially conductive electrodes of a respective array of capacitive touch sensors of each of the thin touch sensor panels. Such substantial optical transparency of the thin mother glass sheet and the patterned thin film can provide for substantial optical transparency of each of the thin touch sensor panels, so that a display can be visible through the thin touch sensor panel, if the thin touch sensor panel is arranged over the display in a portable electronic device.

In some embodiments, other materials may be utilized in addition to, or instead of, ITO. These materials may include, without limitation, amorphous silicon, copper indium diselenide, cadmium telluride and film crystalline silicon. Optionally, the thin films may be protected by one or more passivation layers (organic and/or inorganic). Passivation layers may comprise compositions formed over conductive material and other layers which protect those materials from corrosion and other environmental effects. Various types of passivation layers may be employed. The passivation layers may include, without limitation, passivation layers comprising silicon dioxide and/or silicon nitride.

As shown in FIG. 10, the thin mother glass sheet 101 can be singulated into the thin touch sensor panels 103 using, for example, laser scribing prior to breaking the thin mother glass sheet 101 along the scribing. For the sake of simplicity, in FIG. 10 two rows of four thin touch sensor panels 103 are shown in with right to left hatching, so that eight thin touch sensor panels are shown as produced from the thin mother glass sheet 101. However, it should be understood that the thin touch sensor panels 103 can be differently arranged. For example, the touch sensor panels can be arranged in five rows of seven thin touch sensor panels, so that thirty-five thin touch sensor panels can be produced from the thin mother glass sheet.

Further, for ease of handling, the thin touch sensor panels 103 may be arranged in spaced apart relation as shown in FIG. 10, so as to provide remainder portions of the thin mother glass sheet, which do not include the patterned thin film of the thin touch sensor panels. Accordingly, in handling the thin mother glass sheet 101, the remainder portions may be engaged so as to avoid contacting and/or damaging the patterned thin film of the thin touch sensor panels.

Figure 1D:
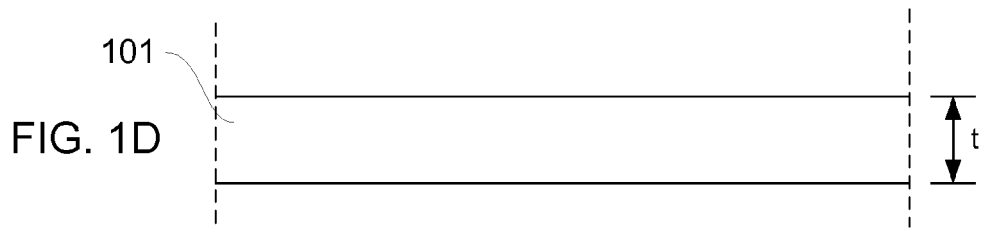
Figure 1E:
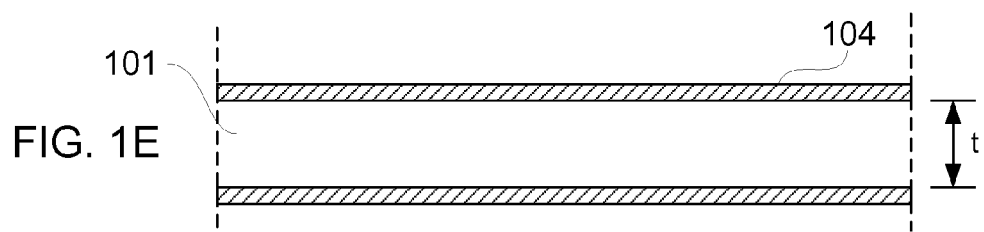
Figure 1F:
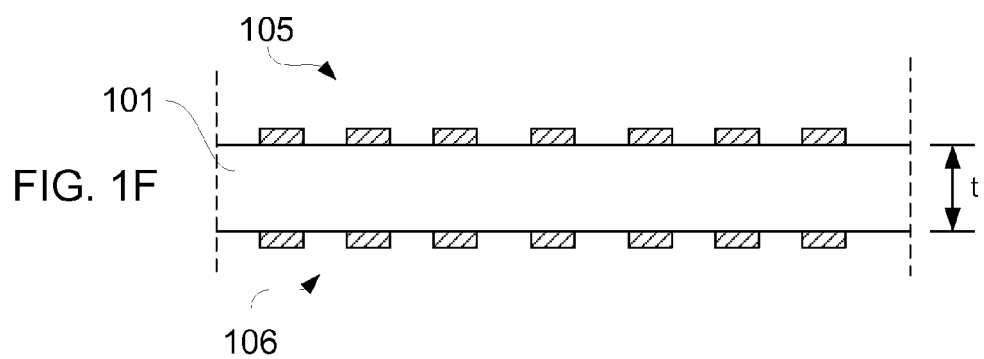

FIGS. 1D-1F are simplified partial cross sectional views of processing the thin mother glass sheet into the thin touch sensor panels. FIG. 1D shows a simplified partial cross section view of the thin mother glass sheet 101, which can have the thickness "t" of substantially less than approximately one-half millimeter. FIG. 1E shows a simplified partial cross sectional view of depositing a first thin film 103, which can be coupled to a first major surface of the thin mother glass sheet 101. As shown in FIG. 1E, a second thin film can be deposited at the same time, which can be coupled to an opposing major surface of the thin mother glass sheet 101.

Thin films of indium tin oxide may be deposited by sputtering, which may also include annealing of the indium tin oxide. While higher temperatures for sputtering and/or annealing of the indium tin oxide may have some advantages for high optical transmittance and low sheet resistance of the indium tin oxide thin film, lower temperatures may provide other advantages in avoiding breakage of the thin mother glass sheet. Accordingly, sputtering may be performed at a temperature, which is sufficiently high for a selected sheet resistance and optical transmittance of the indium tin oxide thin film, while also being sufficiently low so as to avoid breakage of the thin mother glass sheet. In particular, sputtering may be performed at a temperature less than approximately three hundred degrees centigrade, or at a temperature substantially within a range of approximately two hundred and eighty degrees centigrade to approximately three hundred degrees centigrade. Alternative deposition techniques such as vapor deposition may be employed for depositing the indium tin oxide thin films.

FIG. 1F shows a simplified partial cross sectional view the photolithographically patterned indium tin oxide thin films 105, 106 and the thin mother glass sheet 101. As shown in FIG. 1F, the patterned thin films 105, 106 on opposing sides of the thin mother glass sheet may be arranged as opposing electrodes, which may be capacitively coupled through the glass acting as a dielectric, and which may provide a respective array of capacitive touch sensors for each of the thin touch sensor panels.

Figure 1G:
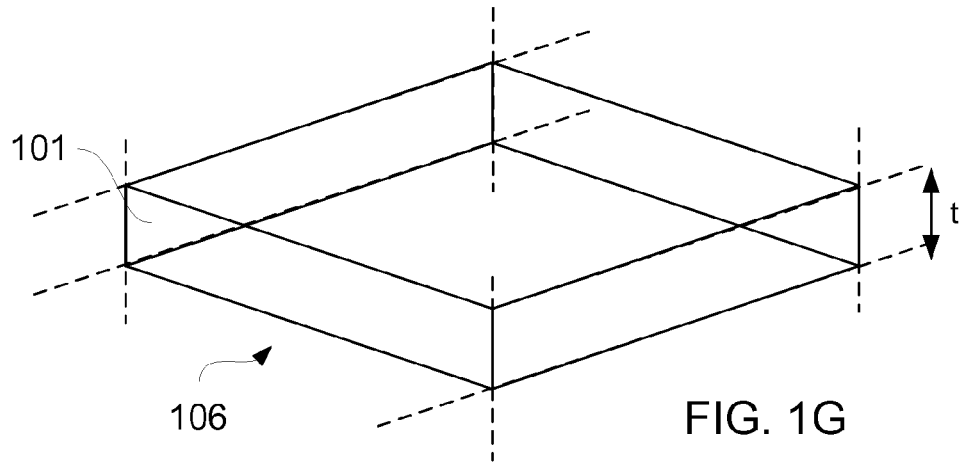
Figure 1H:
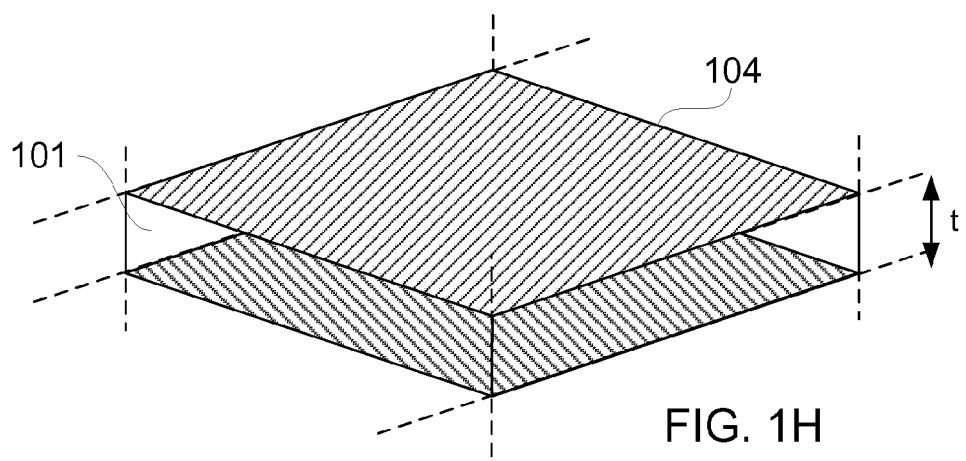
Figure 1I:
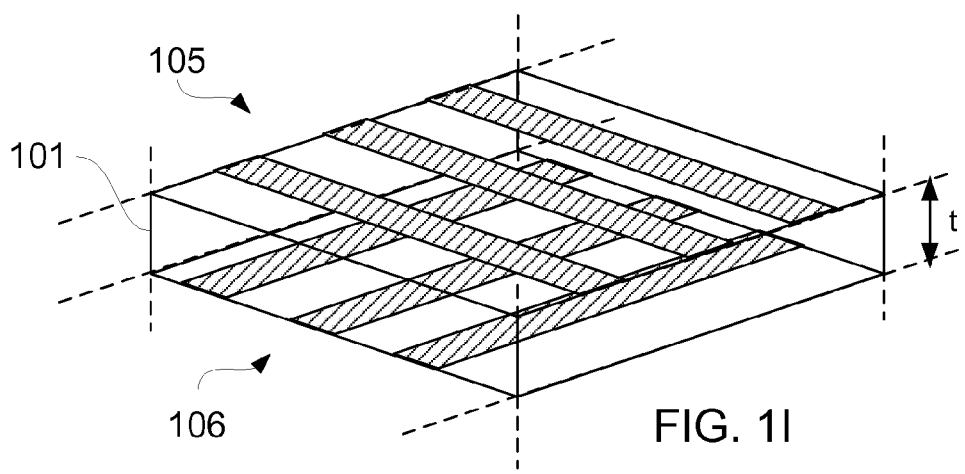

For ease of cross section and layer illustration, the electrode arrangement is shown in FIG. 1F is greatly simplified. As will be discussed in greater detail subsequently herein, electrodes may arranged in a grid pattern of rows and columns on opposing sides of the thin mother glass sheet, so as to provide a two dimensional array of capacitive touch sensors for the thin touch sensor panel. For example, FIG. 1G shows a simplified partial isometric view of the thin mother glass sheet 101, which can have the thickness "t" of substantially less than approximately one-half millimeter. FIG. 1H shows a simplified partial isometric view of depositing the first thin film 103, which can be coupled to the first major surface of the thin mother glass sheet 101. As shown in FIG. 1H, the second thin film can be deposited at the same time, which can be coupled to an opposing major surface of the thin mother glass sheet 101. As shown in a simplified partial isometric view in FIG. 1I, electrodes 105 of the patterned indium tin oxide thin film may be arranged in columns of sense lines on the first major surface of the thin mother glass sheet 101, while the opposing electrodes 106 of the patterned indium tin oxide thin film may be arranged in rows of drive lines on the opposing major surface of the thin mother glass sheet.

During the aforementioned deposition of thin films, edge retention members may be used to orient the thin mother glass sheet substantially vertically. Edge retention members may be shaped so as to substantially conform to the edges of the thin mother glass sheets, so as to hold the thin mother glass sheets securely and limit gaps between the edge retention members and the edges of the thin mother glass sheets. The foregoing may help to limit damage to the thin mother glass sheets during processing.

Figure 2A:
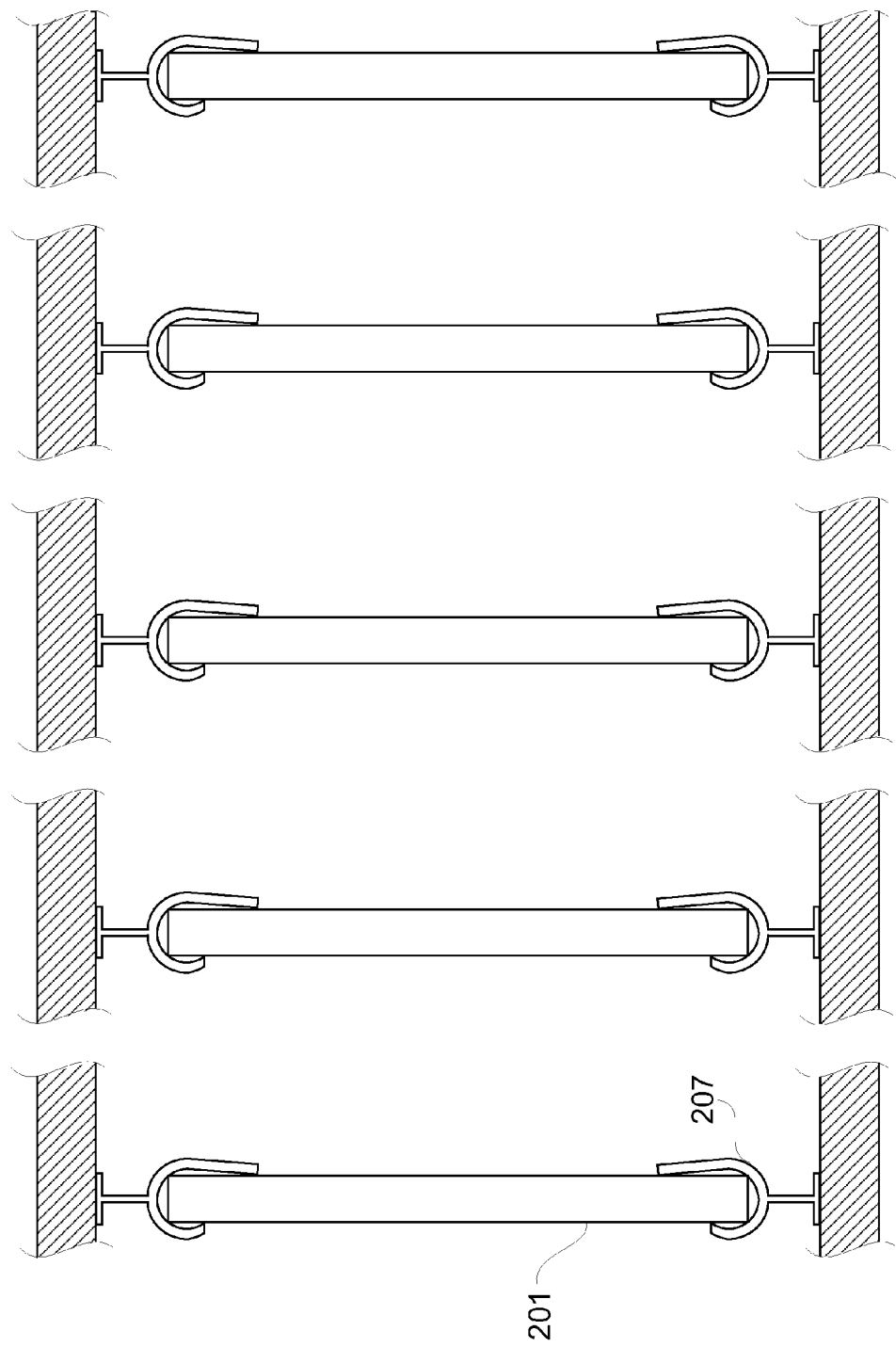
FIGS. 2A-2E show cross sectional views of processing thin touch sensor panels.
Figure 2B:
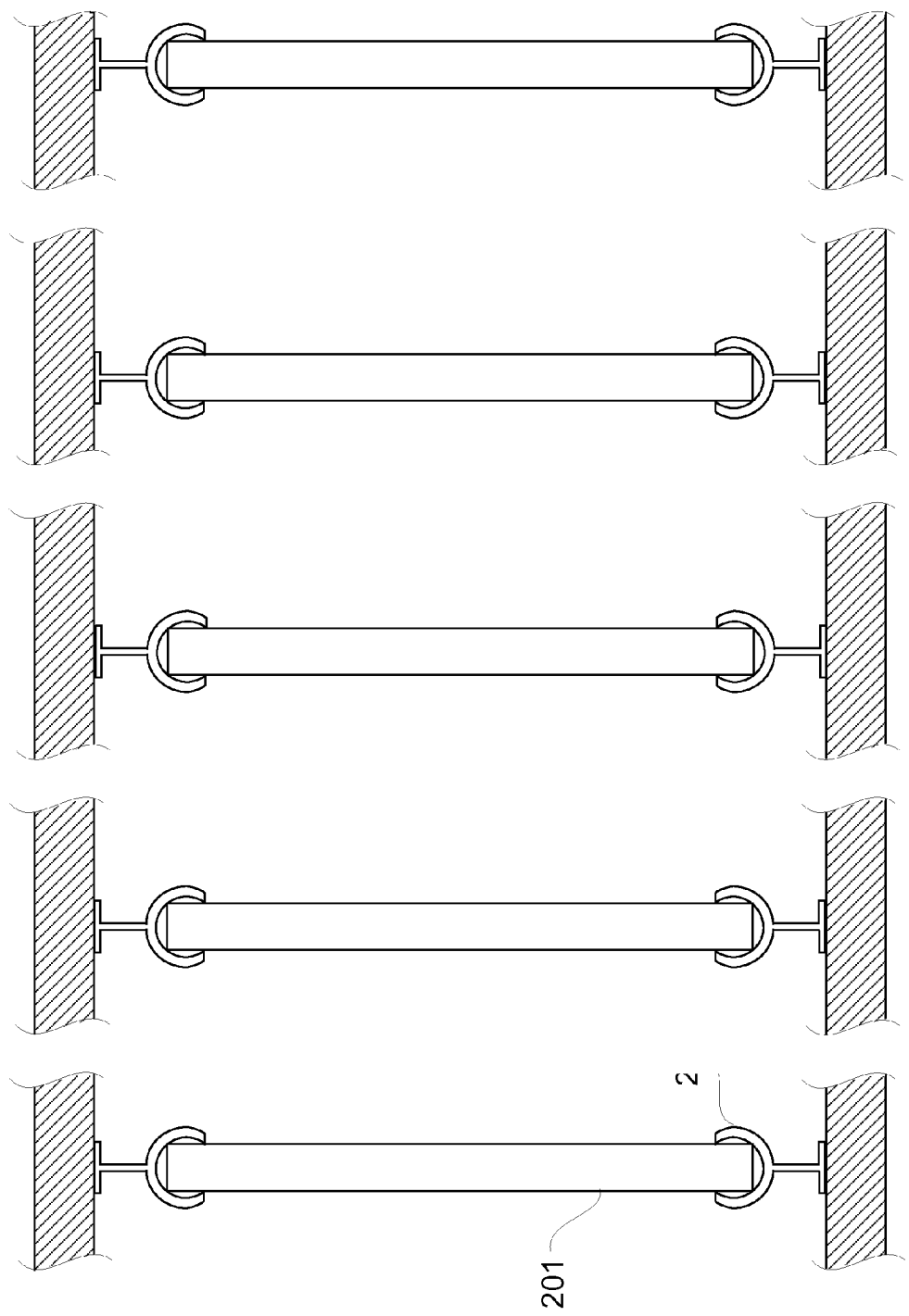
Figure 2D:
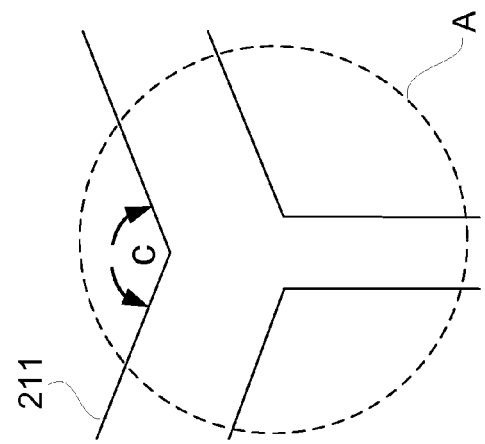
Figure 2C:
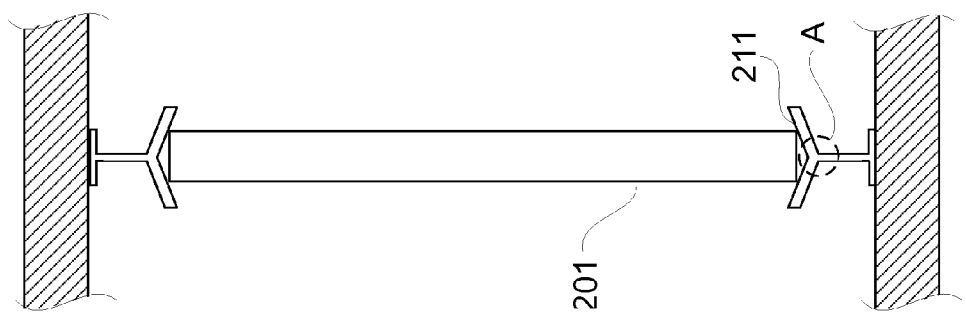
Figure 2C:
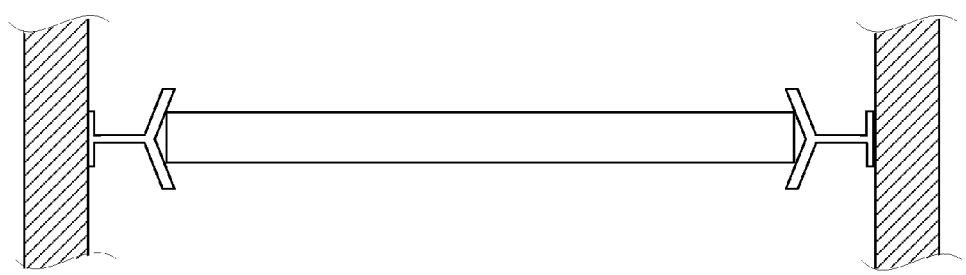
Figure 2C:
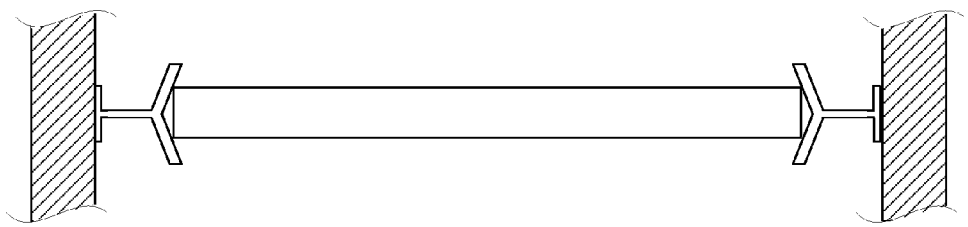
Figure 2E:
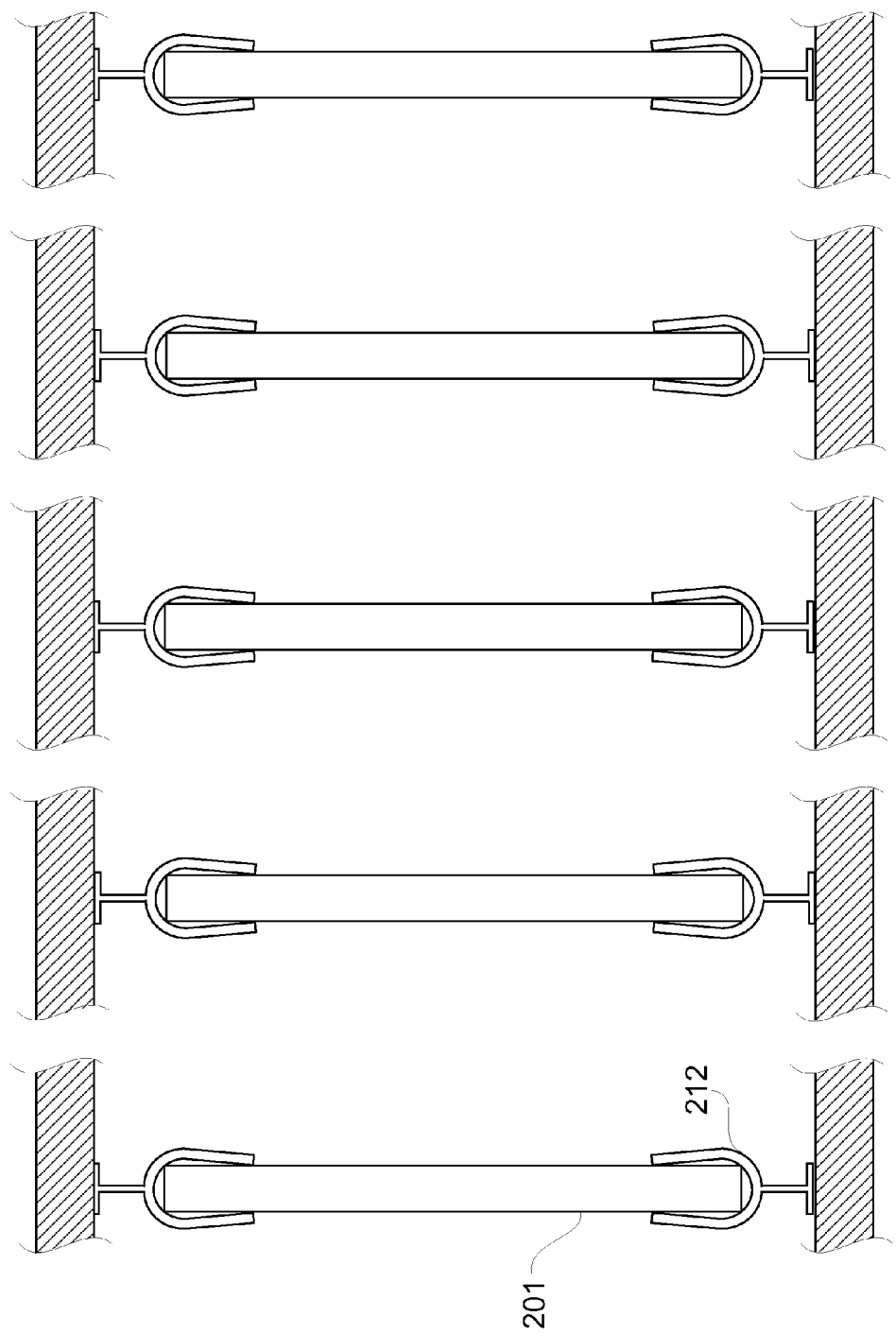

For example as shown in partial cross section view in FIG. 2A edge retention members 207, having substantially J-shaped cross section, may be used to orient the thin mother glass sheet substantially vertically, during the depositing of the thin film. Similarly, as shown in partial cross sectional view in FIG. 2B, edge retention members, having substantially C-shaped cross section, may be used to orient the thin mother glass sheet substantially vertically, during the depositing of the thin film. Further, as shown in partial cross sectional view in FIG. 2C, edge retention members, having substantially V-shaped cross section may be used to orient the thin mother glass sheet substantially vertically, during the depositing of the thin film. As shown in detail in FIG. 2D, the V-shaped cross section may be angled a suitable amount "c". Additionally, as shown in partial cross sectional view in FIG. 2E, edge retention members, having substantially U-shaped cross section may be used to orient the thin mother glass sheet substantially vertically.

There may be undesirable sag of the thin mother glass sheet in various places, if the thin mother glass sheet is not adequately supported during photolithographic patterning of the thin films. Such sag could cause undesirable non-uniformity in photolithographic patterning of the thin films and/or breakage of the thin mother glass sheet. Accordingly, sufficiently numerous support members may be used so as to reduce or avoid undesirable sag, and so as to reduce or avoid breakage of the thin mother glass sheet during photolithographic patterning of the thin touch sensor panels of the thin mother glass sheet. Further, support members may be disposed sufficiently proximate to one another so as to reduce or avoid undesirable sag, and so as to reduce or avoid breakage of the thin mother glass sheet, during photolithographic patterning of the thin touch sensor panels of the thin mother glass sheet.

As mentioned previously herein with reference to FIG. 1O, for ease of handling, the thin touch sensor panels may be arranged in spaced apart relation, so as to provide remainder portions of the thin mother glass sheet, which do not include the patterned thin film of the thin touch sensor panels. Accordingly, in handling the thin mother glass sheet, the support members may be arranged to engage the remainder portions, so as to avoid contacting and/or damaging the patterned thin film of the touch sensor panels, during photolithographic patterning of the thin touch sensor panels.

Figure 3A:
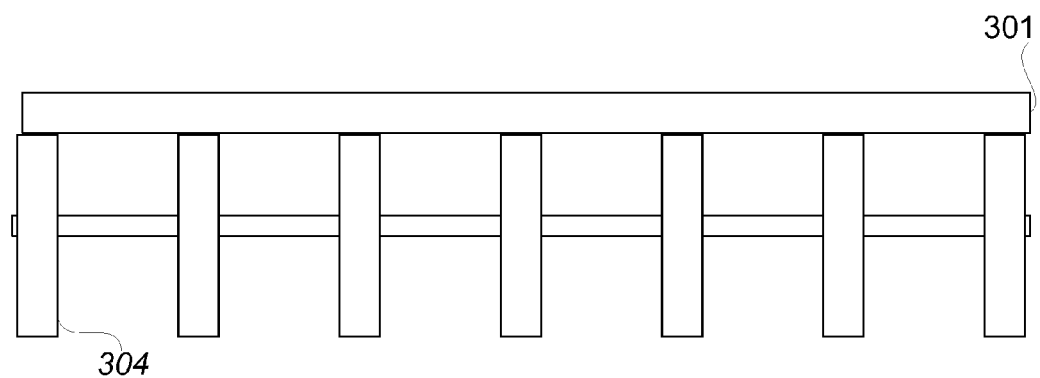
FIGS. 3A-3C show additional cross sectional views of processing thin touch sensor panels.
Figure 3B:
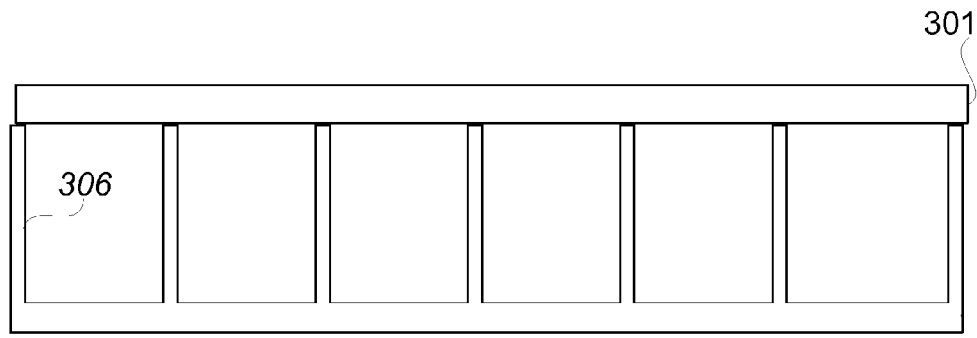

FIGS. 3A and 3B show additional cross sectional views of processing the thin mother glass sheet into the thin touch sensor panels. As shown in FIG. 3A, the support members may comprise more than two coaxially arranged rolling support members 304, extending along a lateral dimension of the thin mother glass sheet, so as to avoid breakage of the thin mother glass sheet 301 during photolithographic patterning of the thin touch sensor panels of the thin mother glass sheet. Further, the rolling support members 304 may be arranged more proximate to one another than approximately 0.3 meter, so as to avoid breakage of the thin mother glass sheet. The rolling support members 304 may be arranged to engage the remainder portions of the thin mother glass sheet, during photolithographic patterning of the thin touch sensor panels.

Figure 3C:
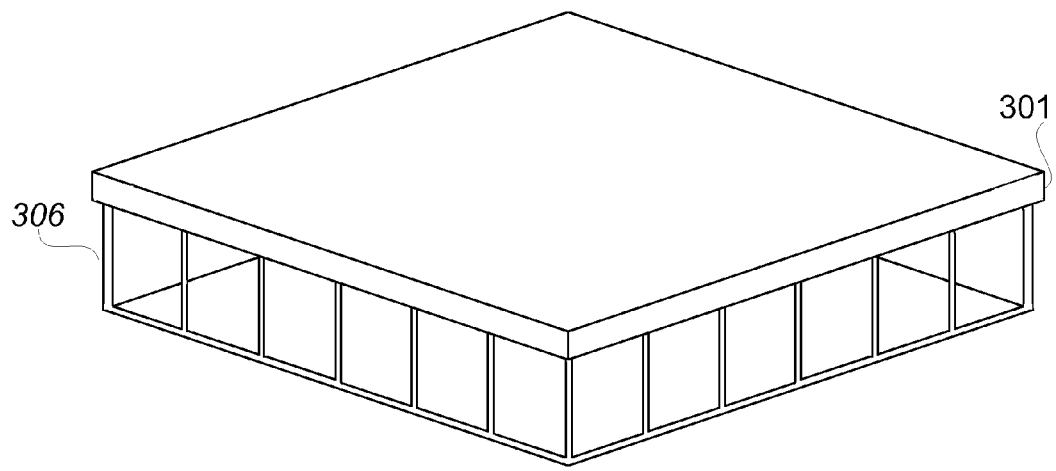

Similarly, baking support members 306 shown in cross sectional view in FIG. 3B and shown in isometric view in FIG. 3C, may be arranged to engage the remainder portions of the thin mother glass sheet, during baking of an applied photoresist layer (not shown in FIGS. 3B and 3C). The support members may comprise more than two laterally arranged baking support members 306, and the baking support members 306 may be disposed more proximate to one another than approximately 0.3 meter, so as to avoid breakage of the thin mother glass sheet 301 during the baking of the applied photoresist layer.

After patterning and etching, photoresist residue can be stripped using a stripping agent applied at a pressure, which is sufficiently high for stripping photoresist residue from the patterned thin film, while also being sufficiently low for avoiding breakage of the thin mother glass sheet.

FIGS. 4A-4D are flow diagrams illustrating embodiments of processing of the thin mother glass sheet into the thin touch sensor panels, each having a thickness of substantially less than approximately one-half millimeter. In one embodiment shown in FIG. 4A, such process 400A may begin with obtaining 402 the thin mother glass sheet having the thickness of substantially less than approximately one half millimeter. The process 400A may continue with depositing 408 a thin film coupled to a surface of the thin mother glass sheet, and photolithographically patterning 410 the thin film, while avoiding breakage of the thin mother glass sheet; and with singulating 412 the thin mother glass sheet into the thin touch sensor panels. Once the thin touch sensor panels have been singulated 412, the process 400A can end.

Figure 4A:
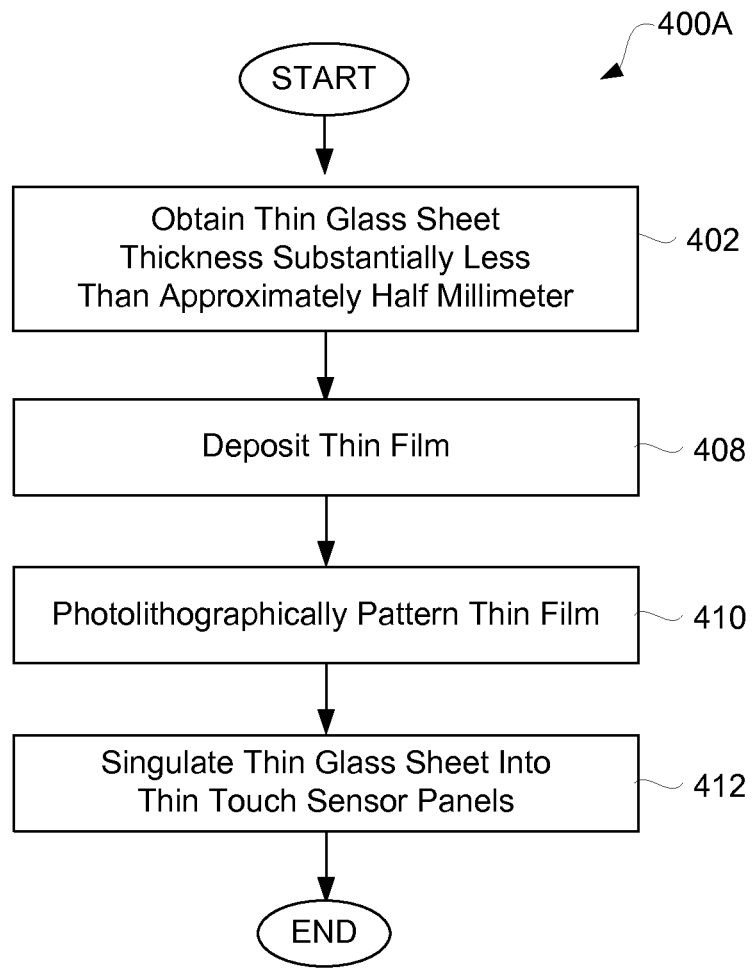
FIGS. 4A-4D are flow diagrams illustrating embodiments of processing of thin touch sensor panels.
Figure 4B:
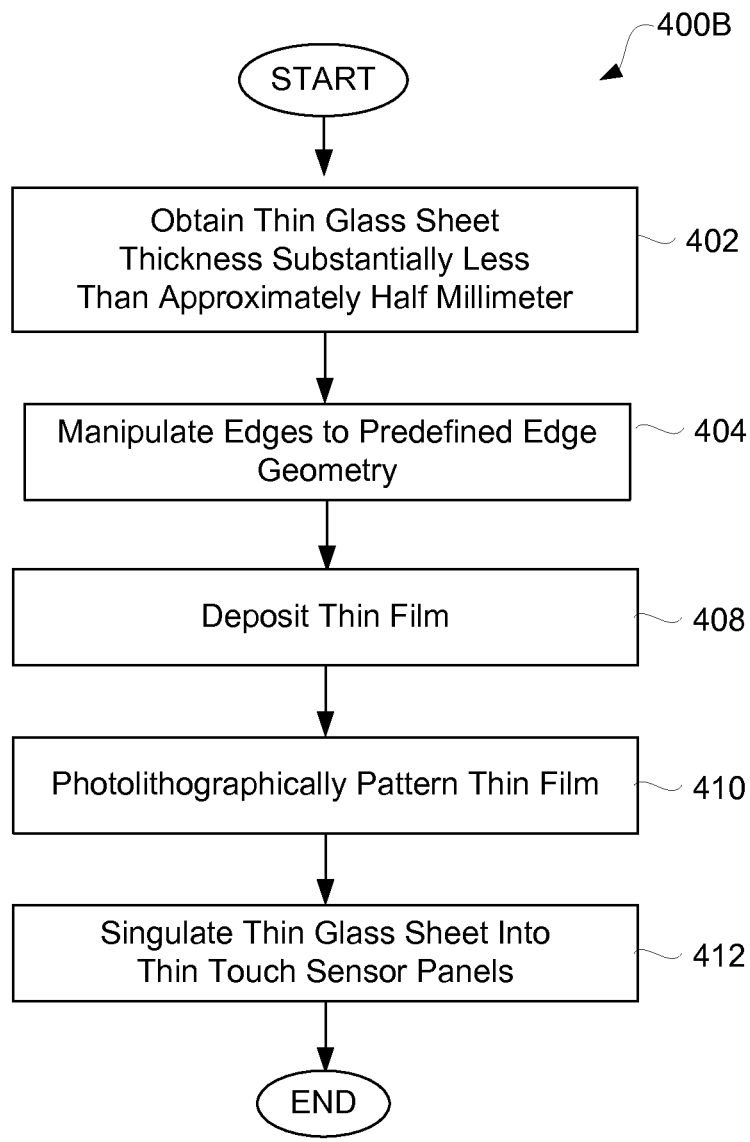

FIG. 4B shows another embodiment, generally similar to that discussed with reference to FIG. 4A, except that edges of the thin mother glass sheet are additionally manipulated.

Such process 400B may begin with obtaining 402 the thin mother glass sheet having the thickness of substantially less than approximately one half millimeter. The process 400B may continue with manipulating 404 edges of the thin mother glass sheet to correspond to a predefined edge geometry, wherein the predefined edge geometry may be selected to strengthen the thin mother glass sheet. In particular, the edge may be rounded as discussed previously herein. The process 400B may continue with depositing 408 a thin film coupled to a surface of the thin mother glass sheet, and photolithographically patterning 410 the thin film, while avoiding breakage of the thin mother glass sheet; and with singulating 412 the thin mother glass sheet into the thin touch sensor panels. Once the thin touch sensor panels have been singulated 412, the process 400B can end.

Figure 4C:
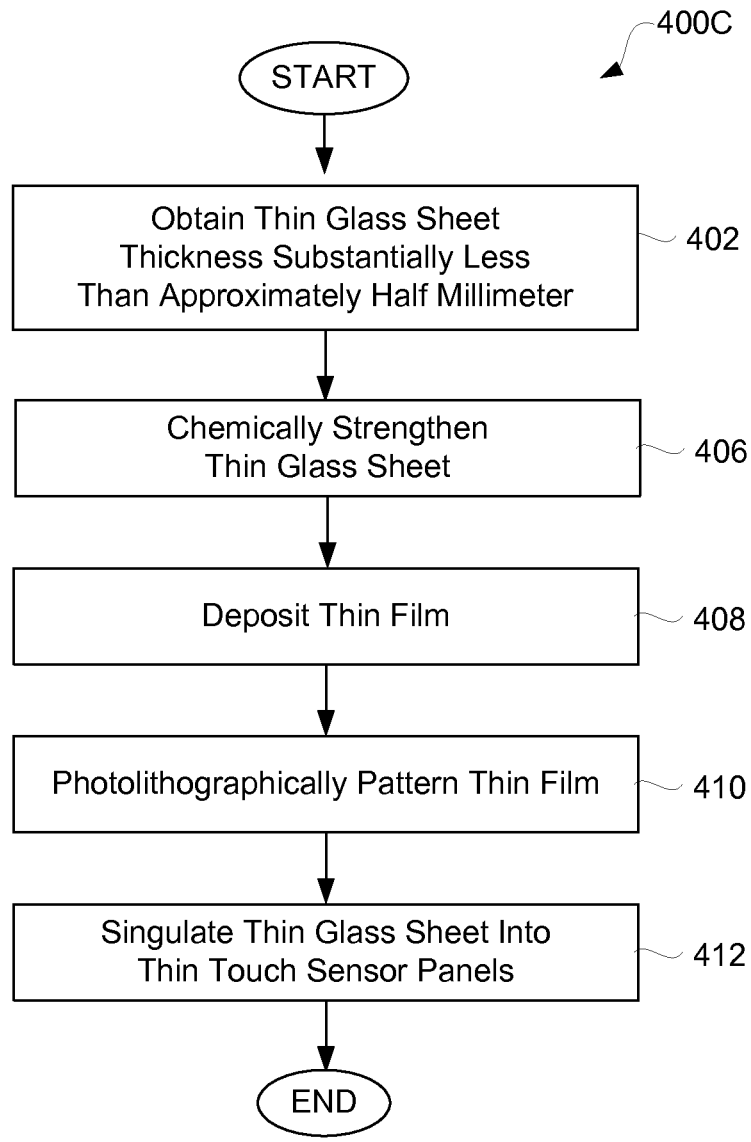

FIG. 4C shows yet another embodiment, generally similar to what was discussed previously with respect to FIG. 4A, except for additionally chemically strengthening the thin mother glass sheet. Such process 400C may begin with obtaining 402 the thin mother glass sheet having the thickness of substantially less than approximately one half millimeter. The process 400C may continue with chemically strengthening 406 the thin mother glass sheet. The process 400C may continue with depositing 408 a thin film coupled to a surface of the thin mother glass sheet, and photolithographically patterning 410 the thin film, while avoiding breakage of the thin mother glass sheet; and with singulating 412 the thin mother glass sheet into the thin touch sensor panels. Once the thin touch sensor panels have been singulated 412, the process 400C can end.

Figure 4D:
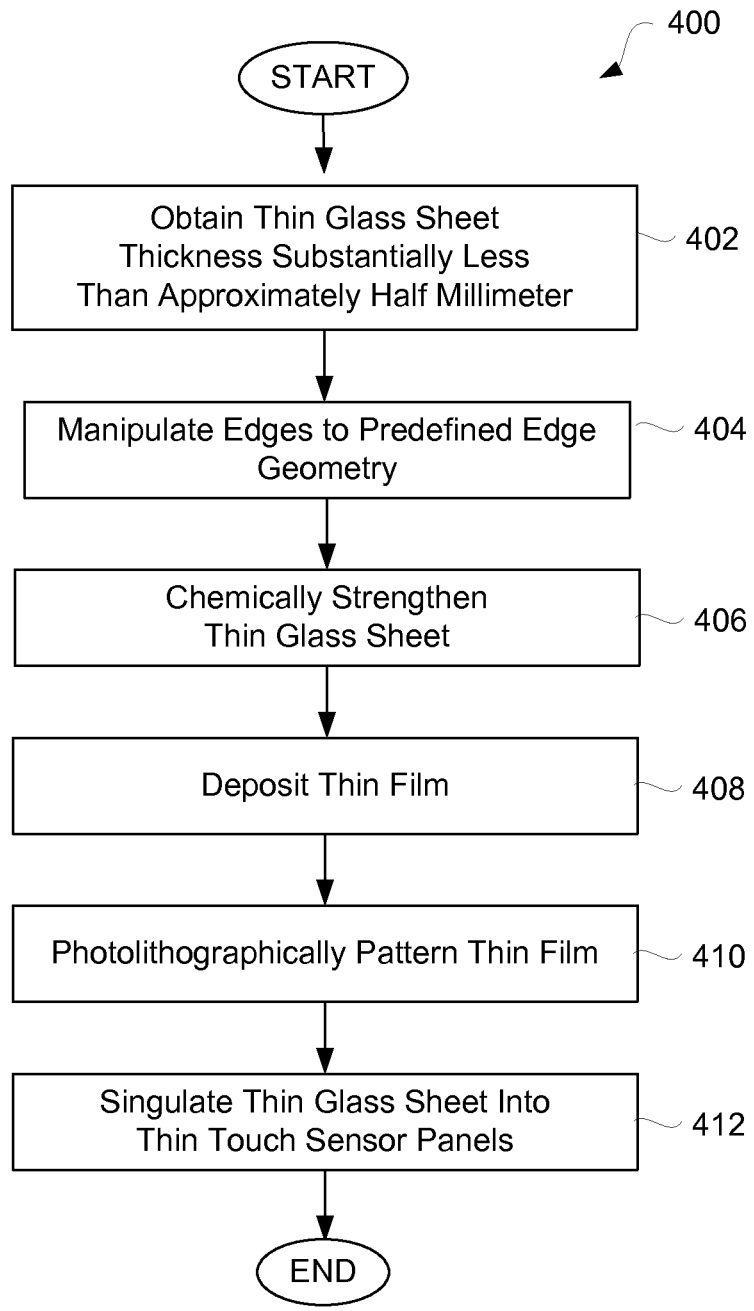

FIG. 4D shows yet another embodiment, generally similar to what was discussed previously with respect to FIG. 4A, except for additionally manipulating edges of the thin mother glass sheet, and further additionally chemically strengthening the thin mother glass sheet. Such process 400D may begin with obtaining 402 the thin mother glass sheet having the thickness of substantially less than approximately one half millimeter. The process 400D may continue with manipulating 404 edges of the thin mother glass sheet to correspond to a predefined edge geometry, wherein the predefined edge geometry may be selected to strengthen the thin mother glass sheet, and with chemically strengthening 406 the thin mother glass sheet.

The process 400D may continue with depositing 408 a thin film coupled to a surface of the thin mother glass sheet, and photolithographically patterning 410 the thin film, while avoiding breakage of the thin mother glass sheet; and with singulating 412 the thin mother glass sheet into the thin touch sensor panels. Once the thin touch sensor panels have been singulated 412, the process 400D can end.

Figure 5A:
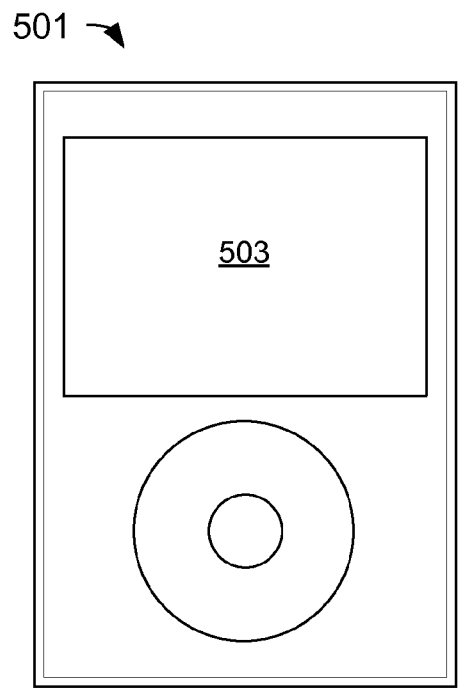
FIGS. 5A and 5B are simplified views of portable electronic devices incorporating thin touch panels.
Figure 5B:
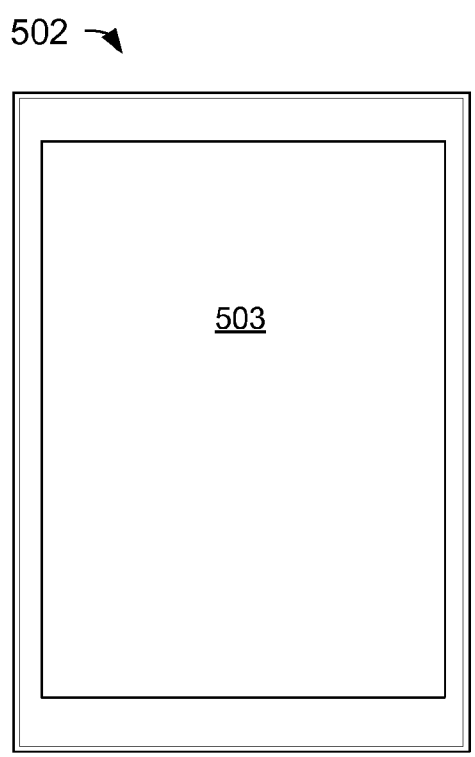

FIGS. 5A and 5B are simplified views of portable electronic devices incorporating the thin touch panels. As discussed previously herein, the thin touch sensor panel 503 may comprise the glass substrate having the thickness of substantially less than approximately one half millimeter, and the first patterned thin film coupled to the first major surface of the glass substrate. The thin touch sensor panels can be substantially optically transparent, so that a display can be visible through the thin touch sensor panel, if the thin touch sensor panel is arranged over the display in the portable electronic device.

FIG. 5A illustrates an exemplary digital media player 501, which can incorporate the thin touch sensor panel 503. FIG. 5B illustrates an exemplary mobile telephone, which likewise can incorporate the thin touch sensor panel 503. The thin touch panel can be incorporated into the portable electronic device in a computerized implementation.

Figure 6:
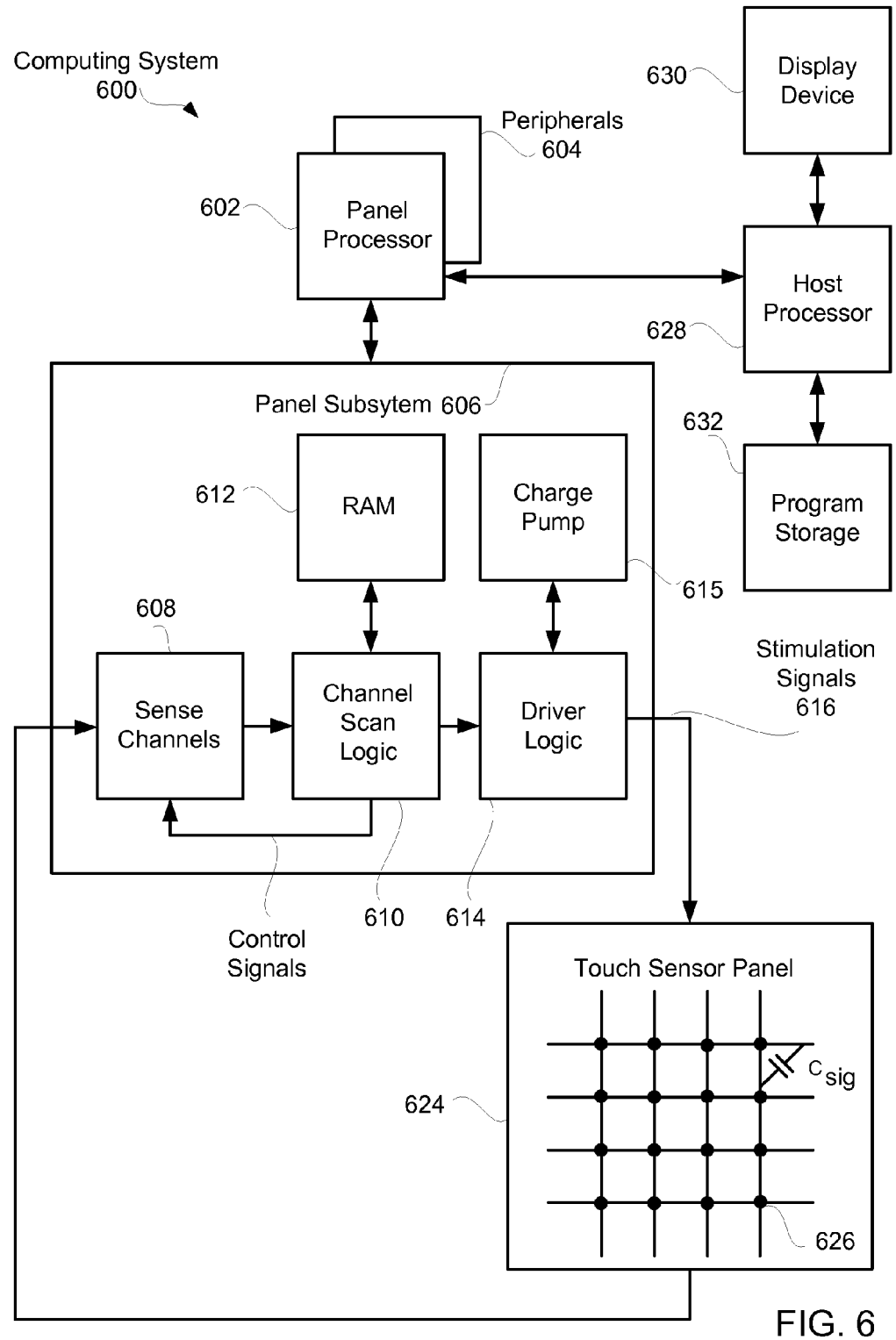
FIG. 6 is a block diagram illustrating computerized implementation of a thin touch panel incorporated into a portable electronic device.

FIG. 6 is a block diagram illustrating computerized implementation of the thin touch panel incorporated into the portable electronic device. Computing system 600 can include one or more panel processors 602 and peripherals 604, and panel subsystem 606. Peripherals 604 can include, but are not limited to, random access memory (RAM) or other types of memory or storage, watchdog timers and the like. Panel subsystem 606 can include, but is not limited to, one or more sense channels 608, channel scan logic 610 and driver logic 614.

Channel scan logic 610 can access RAM 612, autonomously read data from the sense channels and provide control for the sense channels. In addition, channel scan logic 610 can control driver logic 614 to generate stimulation signals 616 at various frequencies and phases that can be selectively applied to drive lines of touch sensor panel 624. Charge pump 615 can be used to generate stimulation signals 616 that can have voltage amplitudes higher than digital logic level supply voltages. Although FIG. 1 shows charge pump 615 separate from driver logic 614, the charge pump can be part of the driver logic. In some embodiments, panel subsystem 606, panel processor 602 and peripherals 604 can be integrated into a single application specific integrated circuit (ASIC).

Thin touch sensor panel 624 can include a capacitive sensing medium having a plurality of drive lines and a plurality of sense lines, although other sensing media can also be used. Either or both of the drive and sense lines can be coupled to the thin mother glass sheet. Each intersection of drive and sense lines can represent a capacitive sensing node and can be viewed as picture element (pixel) 626, which can be particularly useful when touch sensor panel 624 is viewed as capturing an "image" of touch. (In other words, after panel subsystem 606 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 624 can drive sense channel 608 (also referred to herein as an event detection and demodulation circuit) in panel subsystem 606. The capacitance between row and column electrodes may appear as a mutual capacitance Csig when the given row is stimulated with an AC signal.

Computing system 600 can also include host processor 628 for receiving outputs from panel processor 602 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 628 can also perform additional functions that may not be related to panel processing, and can be coupled to program storage 632 and display device 630 such as an LCD panel for providing a user interface to a user of the device. Display device 630 together with touch sensor panel 624, when located partially or entirely under the touch sensor panel, can form touch screen 618.

Additional details on fabrication thin sheet can be found in U.S. Patent Publication No. 2009/0324939 A1, which is hereby incorporated herein by reference.

The advantages of the invention are numerous. Different aspects, embodiments or implementations may yield one or more of the following advantages. One advantage of the invention is that it can help to satisfy consumer demand for making portable electronic devices thinner, by providing a thin touch sensor panel for incorporation into such portable electronic devices. Other advantages of one or more embodiments of the invention are reduction or avoidance of undesired sag in a thin mother glass sheet of the thin touch sensor panels, reduction or avoidance of undesirable non-uniformity in photolithographic patterning of the thin films, and/or reduction or avoidance of breakage of the thin mother glass sheet.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for producing thin touch sensor panels each having a thickness of substantially less than approximately one-half millimeter comprising:
    obtaining a thin mother glass sheet having a thickness of substantially less then approximately one half millimeter;
    holding the thin mother glass sheet in position using a plurality of edge retention members provided on at least two opposing sides of the thin mother glass sheet;
    depositing a thin film coupled to a surface of the thin mother glass sheet while the thin mother glass sheet is held in position using the edge retention members, and photolithographically patterning the thin film, while avoiding breakage of the thin mother glass sheet; and
    singulating the thin mother glass sheet into the thin touch sensor panels.

2. A method as in claim 1,
    wherein the method further comprises manipulating edges of the thin mother glass sheet to correspond to a predefined edge geometry, the predefined edge geometry being selected to strengthen the thin mother glass sheet, and
    wherein the manipulating occurs prior to the holding, the depositing, the patterning and the singulating.

3. A method as in claim 1,
    wherein the method further comprises chemically strengthening the thin mother glass sheet, and
    wherein the strengthening occurs prior to the holding, the depositing, the patterning and the singulating.

4. A method as in claim 1, wherein the edge retention members, have substantially J-shaped cross section, and orient the thin mother glass sheet substantially vertically, during the depositing of the thin film.

5. A method as in claim 1, wherein the edge retention members have substantially U-shaped cross section or have substantially C-shaped cross section and orient the thin mother glass sheet substantially vertically, during the depositing of the thin film.

6. A method as in claim 1, wherein the edge retention members have substantially V-shaped cross section and orient the thin mother glass sheet substantially vertically, during the depositing of the thin film.

7. A method as in claim 1, wherein the depositing comprises depositing at a temperature, which is sufficiently high for a selected sheet resistance and optical transmittance of the thin film, while also being sufficiently low so as to avoid breakage of the thin mother glass sheet.

8. A method as in claim 1, wherein the depositing comprises depositing at a temperature less than approximately three hundred degrees centigrade.

9. A method as in claim 1, wherein the depositing comprises depositing at a temperature substantially within a range of approximately two hundred and eighty degrees centigrade to approximately three hundred degrees centigrade.

10. A method as in claim 1, wherein the photolithographically patterning comprises photoresist stripping using a stripping agent applied at a pressure, which is sufficiently high for stripping photoresist residue from the patterned thin film, while also being sufficiently low for avoiding breakage of the thin mother glass sheet.

11. A method as in claim 1, wherein the method further comprises:
    manipulating edges of the thin mother glass sheet to correspond to a predefined edge geometry, the predefined edge geometry being selected to strengthen the thin mother glass sheet, and
    chemically strengthening the thin mother glass sheet.

12. A method as in claim 11, wherein the manipulating and the strengthening occurs prior to the depositing, the patterning and the singulating.

13. An apparatus for photolithographic patterning of thin touch sensor panels each having a thickness of less than one-half millimeter, the apparatus comprising:
    a thin mother glass sheet of the thin touch sensor panels, wherein the thin mother glass sheet has a thickness of less then one half millimeter; and
    a plurality of support members sufficiently numerous so as to avoid breakage of the thin mother glass sheet during photolithographic patterning of the thin touch sensor panels of the thin mother glass sheet,
    wherein the mother glass sheet is not thinned after the photolithographic patterning.

14. An apparatus as in claim 13, wherein the support members comprise more than two coaxially arranged rolling support members, so as to avoid breakage of the thin mother glass sheet.

15. An apparatus as in claim 13, wherein the support members comprise more than two laterally arranged baking support members, so as to avoid breakage of the thin mother glass sheet during baking of an applied photoresist layer.

16. An apparatus as in claim 13, wherein the thickness of the thin mother glass sheet is less than about 0.4 millimeter.

17. An apparatus as in claim 13, wherein the thickness of the thin mother glass sheet is approximately 0.3 millimeter.

18. An apparatus as in claim 13, wherein the photolithographic patterning of the thin touch sensor panels comprises forming a substantially optically transparent patterned thin film on the thin mother glass sheet.

19. An apparatus as in claim 13, wherein the thin mother glass sheet comprises chemically strengthened glass.

20. An apparatus as in claim 19, wherein edges of the thin mother glass sheet have a predefined, rounded edge geometry.

21. An apparatus for photolithographic patterning of thin touch sensor panels each having a thickness of less than approximately one-half millimeter, the apparatus comprising:
- a thin mother glass sheet of the thin touch sensor panels, wherein the thin mother glass sheet has a thickness of less then approximately one half millimeter; and
- support members disposed sufficiently proximate to one another so as to avoid breakage of the thin mother glass sheet, during photolithographic patterning of the thin touch sensor panels of the thin mother glass sheet,
- wherein the mother glass sheet is not thinned after the photolithographic patterning.

22. An apparatus as in claim 21, wherein the support members comprise rolling support members more proximate to one another than approximately 0.3 meters, so as to avoid breakage of the thin mother glass sheet.

23. An apparatus as in claim 21, wherein the support members comprise baking support members disposed more proximate to one another than approximately 0.3 meters, so as to avoid breakage of the thin mother glass sheet during baking of an applied photoresist layer.

24. An apparatus as in claim 21,
- wherein the photolithographic patterning of the thin touch sensor panels comprises forming a substantially optically transparent patterned thin film on the thin mother glass sheet,
- wherein the thin mother glass sheet comprises chemically strengthened glass.

25. An apparatus as in claim 24, wherein edges of the thin mother glass sheet have a predefined, rounded edge geometry.

* * * * *